INVENTORS
JOHN M. CONNELL
RICHARD C. JOHNSON
BY
Richard H. Thomas
ATTORNEY

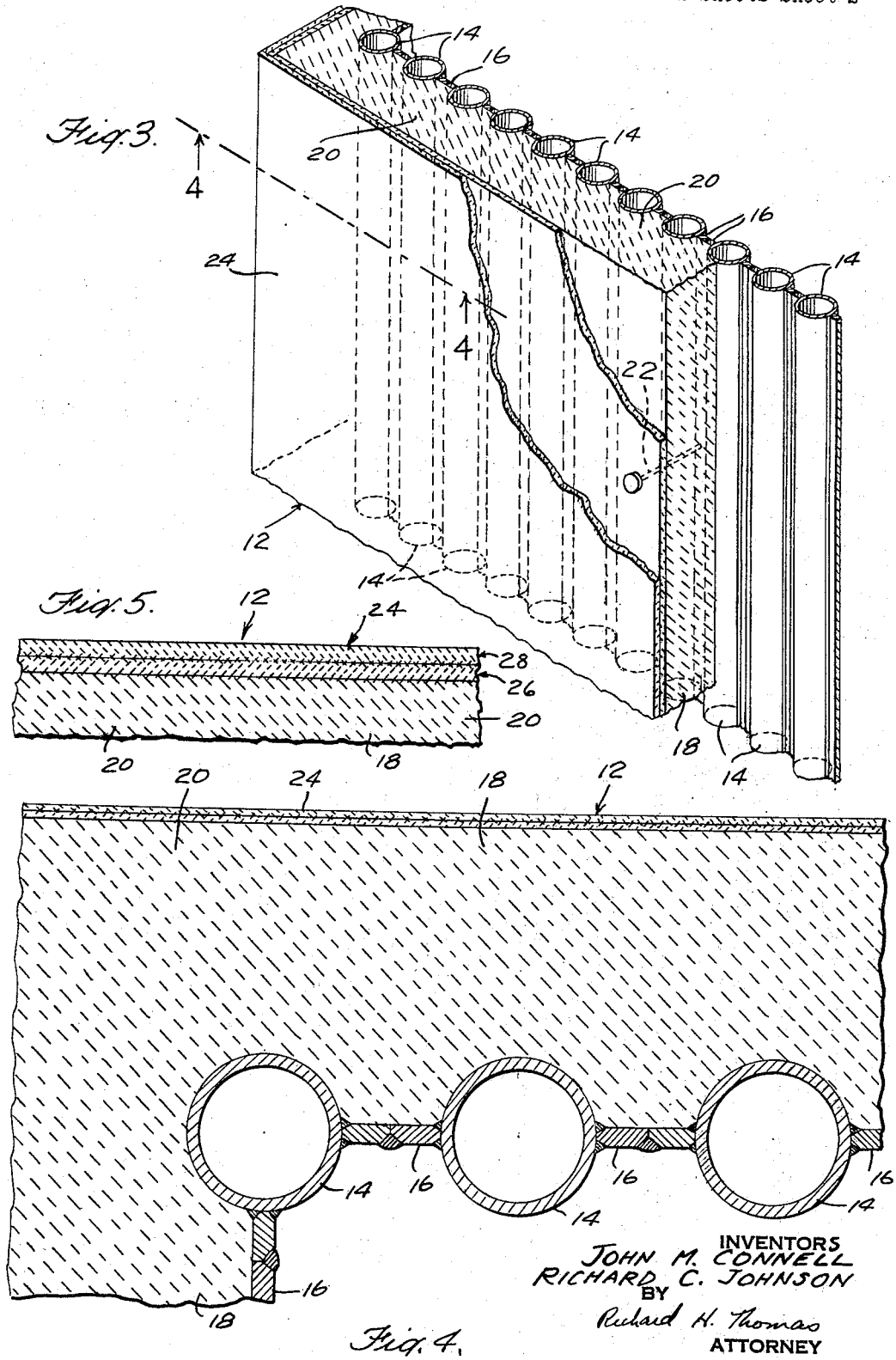

United States Patent Office 3,375,628
Patented Apr. 2, 1968

3,375,628
INSULATED WALL CONSTRUCTION FOR
HEATED SURFACES
John M. Connell, Mountain Lakes, N.J., and Richard C.
Johnson, Dansville, N.Y., assignors to Foster Wheeler
Corporation, New York, N.Y., a corporation of New
York
Filed July 1, 1965, Ser. No. 468,819
11 Claims. (Cl. 52—309)

ABSTRACT OF THE DISCLOSURE

An enclosure for heated surfaces capable of accommodating expansion and contraction of the heated surface without the use of expansion joints comprising an inner fibrous insulation layer having a compressibility sufficient to absorb at least a portion of the expansion of the heated surface, and an outer thermosetting resin layer bonded to the insulation layer and reinforced in part by fibers in the insulation layer having a tensile strength and modulus of elasticity sufficient to compensate for at least the remainder of the expansion of the heated surface.

The present invention relates to an enclosure for heated surfaces, and in particular to an improved insulation and outer casing construction. Heated surfaces of the type contemplated include steam generator fin-tube walls, a boiler water wall skin casing, or any metallic enclosure which contains hot gases.

It is known to use blanket or felted insulation (made from fiber glass or mineral wool) fastened to hot metallic surfaces with suitable pins and clips, replacing the individual tile and high temperature block construction of the prior art. However, the utilization of these fibrous materials requires excessive cutting and fitting; filling or leveling at all open joints; frequent reinforcing with wire or wire mesh; and double layer construction where non-standard thicknesses exist. Furthermore, these insulations usually require a costly weather-proof enclosure of either steel or aluminum sheathing.

Some of the above disadvantages were overcome by the development of sprayed asbestos insulations containing a blend of carefully selected asbestos fibers and an inorganic binder. A typical insulation is "Limpet" (registered trademark J. W. Roberts Ltd.). Packaged in a dry fibrous form, the "Limpet" is fed into a spray machine in combination with finely atomized water to form a lightweight, heat resistant, seamless felt-like coating. The compound dries and adheres to the wall against which it is sprayed and when dried becomes a continuous insulation, exactly fitting tube and wall contours.

The insulation, while strong enough to walk upon, can be gouged by scraping and is likely to absorb moisture. To protect the insulation against these normal hazards, it is presently conventional practice to apply over the outer surface of such an insulation a casing of aluminum panels, or a protective mastic coating.

Although the fibrous insulation has some resiliency to absorb expansion differences between the boiler tube wall and the encompassing outer casing, this resiliency is insufficient to prevent rupture of the casing, requiring the use of expansion elements in the casing.

In addition, metal projections from the boiler wall, such as soot blower openings, or framework members, which move with expansion of the boiler wall, place a direct stress on the casing requiring the use of expansion joints in the casing between such projections.

In accordance with the invention, it was discovered that an improved insulation enclosure system free of expansion joints but including an outer casing-like layer is obtained by applying to the outer surface of a thick fibrous insulation layer a circumambient reinforced resin layer, the resin layer comprising a thermosetting resin phase or matrix and a reinforcing fibrous phase. The resin phase or matrix is applied so that on curing the hardened resin becomes an integral part of the surface of the insulation layer; i.e., to the extent that the surface fibers of the insulation layer constitute at least in part the fibrous phase of the reinforced resin layer. It was found that the resiliency of the insulation layer and elasticity of the reinforced resin layer co-acted in a surprising manner to compensate for thermal expansion of the metallic wall, sufficient or to the extent required to eliminate the need for expansion joints; and to the extent that the working stress imposed on the reinforced resin layer by thermal expansions, through either the mechanism of expansion within a cold envelope, or the mechanism of projections moving apart, was well within the strength limits of the resin.

In addition to offering a hard protective coating, the reinforced resin layer provides weatherproofing, an attractive appearance, additional insulation, and a degree of structural strength to the system.

In cross section, the resin layer preferably is in the order of at least ⅛ inch in thickness, comprising a first stratum of absorbed resin and insulation fibers, and an overlying stratum of either plain resin, or resin reinforced with a material such as fiber glass. Both the absorbed and overlying strata may be thickened with powdered or fibrous fillers.

The invention and advantages thereof will become apparent upon further consideration of the specification and accompanying drawings, in which:

FIGURE 3 is a perspective section view of a portion of the enclosure of FIGS. 1 and 2;

FIGURE 4 is a section view taken along line 4—4 of FIG. 3; and

FIGURE 5 is an enlarged section view showing details of the wall construction.

Figure 1:
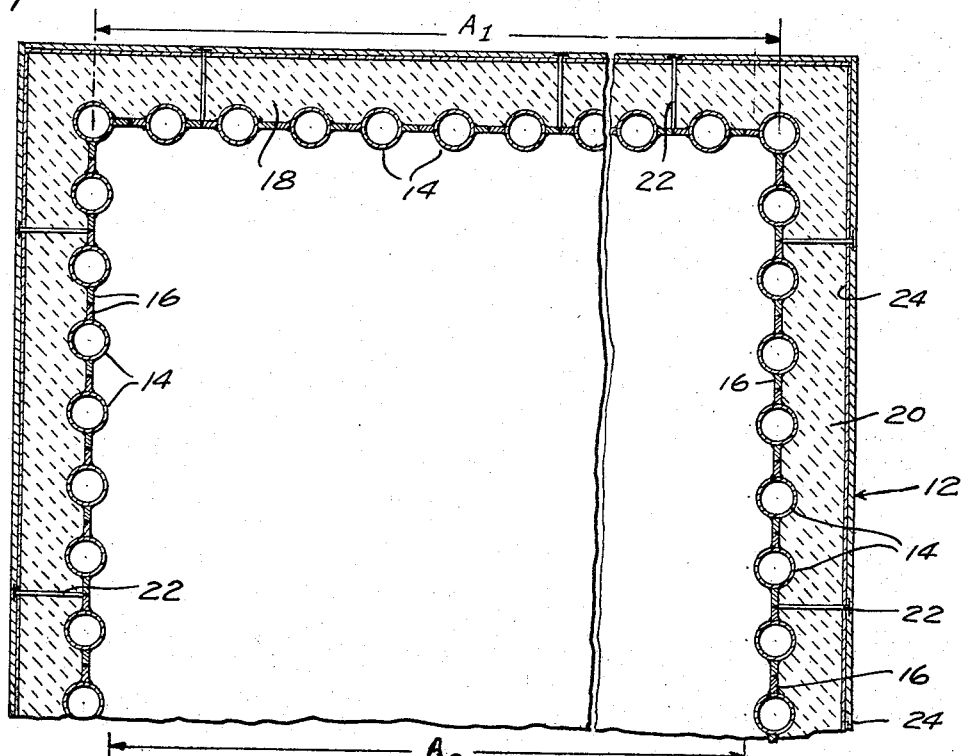
FIGURES 1 and 2 are plan section views showing the enclosure in accordance with the invention in the heated and cooled states respectively.
Figure 2:
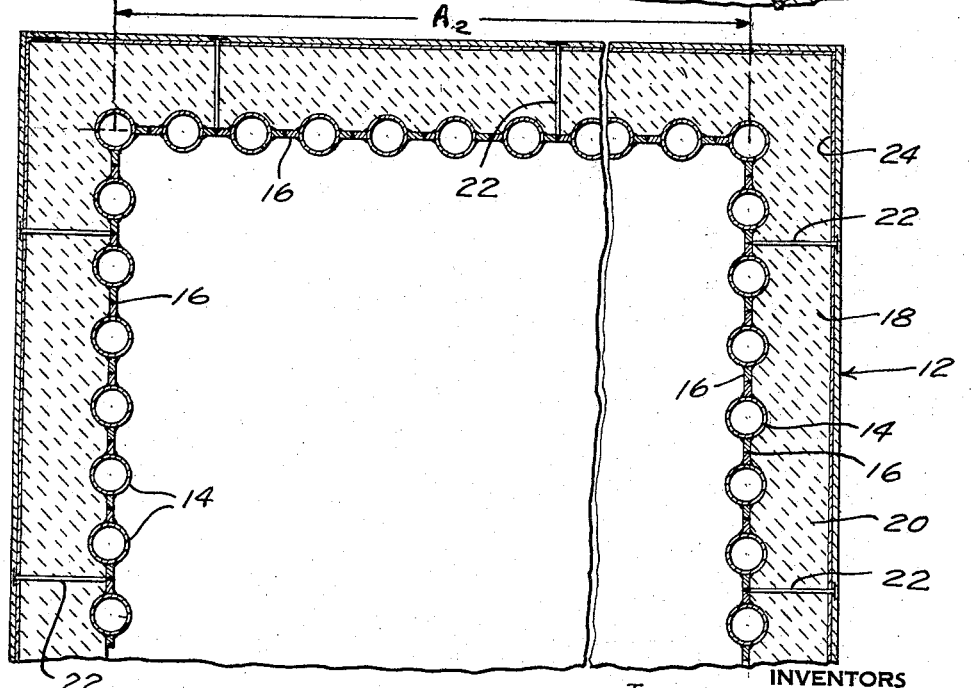

Referring to FIGS. 1–5, a boiler or steam generator wall or enclosure 12 comprising parallel tubes 14 connected by intermediate fins 16 provides a gas-tight construction or enclosure for a steam generator pressurized furnace chamber. FIGS. 1 and 2 show the expansion experienced in the wall when heated, the dimension $A_1$ in FIG. 1 showing the boiler tube surface in an expanded state as compared to the dimension $A_2$ in FIG. 2 for the tube surface in a cooled state. This expansion may be in the order of 0.50 inch per ten feet of wall.

Covering the outside of the tubes 14, the insulation 18 of the enclosure system first comprises a circumambient low thermal conductivity fibrous layer 20 such as asbestos, fiber glass, mineral wool, or aluminum silicate fibers. Preferably, the layer is spray applied and contains proprietary binders such as bentonite, Portland cement, or high temperature calcium aluminate cements applied with the fibers.

In a particular example of an insulating layer, "Asbestospray" (a registered trademark of Abestospray Corporation) consists of a blend of milled, air-separated, African amosite asbestos fibers (calcium-magnesium silicate) and African crocidolite (soda-iron-magnesium silicate), containing a calcium aluminate binder. In general, "Asbestospray" is recommended for high temperature use up to at least 1000° F. For temperatures less than 750° F. a Portland cement binder may be used.

Use of the system of this invention will be usually with metallic surfaces having a maximum face temperature of 850° F.

With respect to spray application of the fibrous insulation layer 20, many types of equipment are available designed to deliver a controlled blend of the fibers and inorganic binder to a spray gun where it is mixed with a fine water spray before impinging on the surface to be insulated.

The most desirable characteristic of the fibrous insulation layer (for purposes of this invention) is that it be resilient, with a low compressive strength (resistance to compression), although high enough to afford a suitable walking surface without compressive failure of the insulation. In general, the compressibility of the fibrous insulation layer should be sufficient to absorb a substantial proportion of the surface expansion from the cooled to the heated state of FIGS. 1 and 2. With asbestos, the mass of fine interlaced asbestos fibers seems to absorb the differential unit movements caused by thermal changes.

As a measure of resiliency, fibrous insulations having a compressibility of 25% under a load of 5 to 10 pounds per square inch have been found satisfactory, and the compressibility under this load should be at least 15%.

One important advantage in accordance with the invention is that the resiliency of the insulation avoids "gas laning," or the formation of fissures along which gases leak. This is extremely important with the use of impermeable outer layers covering the outside of the insulation.

Other requirements for the insulation layer are that it be capable of withstanding high temperatures (e.g., with certain applications, as much as 1250° F.), that it be bondable to metallic surfaces (the thickness of the layer may be up to 10 inches), that it be easily removed and replaced for local repair, that it be vibration-resistant and that it be capable of maintaining its integrity.

The following table gives average values for certain properties of an "Asbestospray" insulation, three inches in thickness.

TABLE I

| | Asbestospray |
|---|---|
| Density, #/ft.³ | 10.3 |
| Compressive strength, p.s.i. (for 25% deformation) | 8.6 |

In accordance with the invention it may be desired to use metallic anchor holds 22 at spaced locations around the boiler surface, around which the insulation is sprayed assisting in the retention of the insulation to the wall. These holds are suitably welded to the metallic wall 16.

Outside of the fibrous insulation layer 20, a reinforced resin layer 24 forms an integral part of the insulation layer surface, composed of a thermosetting resin reinforced in part with fibers of the elemental insulation material, for instance asbestos. Typical asphaltic or bitumastic resins used conventionally behave initially like thermoplastics in that they loose strength with increasing temperatures. On aging they crack at freezing temperatures due to shrinkage and embrittlement. Their modules of elasticity also seems to increase with age. In contrast, the thermosetting resins are capable of elastic deformation (no provision need be made for controlling cracking due to thermal expansion, or thermal embrittlement of the resin), are weather and erosion resistant, and have a low permeability to moisture and air. The reinforcing fibers of the insulation layer surface impart to the resin a high tensile strength, impact resistance, and thermal stability.

In practice, the reinforced resin layer is at least 1/16 inch, and preferably 1/8 inch in thickness, or more, and may be brush applied or spray applied. Usually on solidifying (the resin undergoes an irreversible polymerization or curing into an infusible solid), the resin shinks from 4–8% (volume-wise) which is absorbed by the insulation layer assuring a tenacious reinforced envelope.

An acceptable resin, from the view point of properties and costs, is a styrene-modified polyester resin. These resins are long-chain, condensation reaction products of difunctional acids and alcohols. During manufacture, the hot, fluid, polyester polymer is dissolved in a monomer, such as styrene, which serves as a solvent. The styrene also acts as a potential intermediate reactant which, when properly catalyzed, forms a hard insoluble mass.

The most common catalysts are benzoyl peroxide and methylethylketone (MEK) peroxide. Curing of the liquid resin is accomplished by one of two basic methods, both of which require a peroxide catalyst. One method utilizes heat to activate the catalyst. The second method requires a promoter (or accelerator), such as a cobolt or aniline organic compound which serves to activate the peroxide catalyst at ambient temperatures. The resulting exothermic reaction generates considerable heat within the mixture.

The particular behavior of the resin during and after application may be controlled by inhibitors, thixotropic supplements, or fire-retardant additives. Fibrous and powdered fillers may also be added. Most of the resins tested contained antimony trioxide additions to insure self-extinguishing properties for the composite. Other flame retardant resins may be used such as unsaturated halogenated polyester resins. Certain additives, called flexible resins, such as Laminac EPX–126–3 (registered trademark of American Cyanamid as set forth in Cyanamid publication "Technical Data Laminac Polyester Resin EPX–126–3" copyright October 1963) may also be added lowering the modulus of elasticity (increasing elasticity) of the resin without loss of tensile strength.

Other resins may be substituted if other properties are desirable; i.e., some epoxy resins will afford higher tensile strengths and lower volume shrinkages. Epoxies also have lower creeping tendencies than polyesters.

Most polyester resins have a maximum operating temperature of 350° F. whereas epoxy compositions will retain a high percentage of original strength at 500° F. Epoxies also have superior adhesive characteristics and will bond to a variety of substrates. They are more expensive and more toxic than the polyester resins, and their toxicities may limit the use of epoxy resins for some spray-up applications.

Although the asbestos fibers contribute to the strength of the resin matrix, these fibers are short in length offering limited reinforcement, and higher strengths may be desired. This can be achieved by the use of an additional reinforcement media having longer fibers, so that the reinforcing fibrous phase of the resin layer can be termed heterogeneous. Fiber glass is suitable and can be used as a .01 inch thick glass fabric woven with parallel strands, as woven roving (.05 inch thick) with heavy parallel strands, as a random strand mat bonded with a small quantity of high solubility polyester resin, or as continuous strand roving supplied as untwisted multi-strands which may be deposited as chopped fibers varying in length from ½ to 4 inches. The glass content may vary depending on the strength desired from perhaps a maximum of 75% with the .01 inch thick glass fabric to 50% or less with chopped fiber glass roving. As a general rule, to achieve higher strengths, most applications will require a glass content of at least 25–35%, and 29% is considered optimum.

It should be noted that the above percentages do not include amounts of resin absorbed into the asbestos insulation surface.

In other words, in a typical case, with the use of chopped or continuous roving, a reinforced resin layer may be 1/8 inch in thickness, 1/16 inch being a resin and asbestos fiber stratum (as the resin is absorbed this distance into the insulation layer) and 1/16 inch—a stratum of remaining resin and fiber glass. The overall ratio of resin and continuous roving glass applied to the insulation is ten parts resin by weight to two parts glass. However, approximately five parts resin are absorbed into the insulation surface, leaving a ratio of remaining resin around fiber glass at about five parts to two, or in the converse, about 30% fiber glass. This is the critical ratio in the overlying stratum with respect to achieving additional strength.

FIG. 5 shows this in detail, the numerals 20 and 24 referring to the insulation layer and reinforced resin layer respectively. The numeral 26 refers to the insulation—absorbed resin stratum of the resin layer, whereas the numeral 28 refers to the overlying fiber glass and resin stratum. No distinguishable boundary exists between the resin matrix of the two strata.

If the insulation layer is asbestos, and as these fibers are very fine, a capillary action results so that the penetration of resin could be excessive with a waste of resin. A paramount consideration is the cost of the resin, and economics dictate that a minimum amount of resin be used while satisfying strength and other requirements. To avoid the use of excessive resin in the above case, since it was found that a 1/16 inch penetration was sufficient for the particular application involved, a thin seal coat, (the five parts of resin) was first applied to the insulation surface which coat was catalyzed to have a fast gel time limiting absorption to the desired 1/16 inch. Subsequently, when the seal coat was tacky, the resin and fiber glass, in the ratio of five parts to two, were applied.

As a general rule, it is preferred that the reinforced resin layer have a tensile strength between 9000 and 18,000 p.s.i. (at 77° F.). A 1/16 inch reinforced resin layer having a glass content (chopped roving) of 29% has a published tensile strength of about 13,000 p.s.i. The 1/8 inch reinforced resin layer has a higher overall tensile strength as a result of its greater thickness.

The 1/16 inch reinforced resin layer may also be composed of resin containing (in lieu of the above-mentioned fiber glass reinforcement) fibrous asbestos, fiber glass fillers, or powdered fillers, such as Whiting, China clay, talc, perlite, pumice, mica, barytes, alumina, antimony trioxide, calcium sulfate, silica, or powdered metal. These fillers may also be added in predetermined amounts to the first seal coat for the purpose of limiting absorption of the resin into the insulation layer.

The following table compares the properties of some polyester resins, carbon steel, and aluminum. It will be noticed that the reinforced resins compare favorably in tensile strength with steel, and at the same time have much lower tensile moduli of elasticity. Also favoring the polyester resins are high coefficients of expansion, low densities, and low thermal conductivities.

The extreme fineness of the asbestos fibers permits compounding them to higher fiber to resin ratios, which results in durable laminates that are high in strength with good chemical and water resistance. The fine asbestos fibers also have excellent wetability characteristics which affords an exceptional bond development between the fiber and resin. Also, the asbestos-reinforced resins yield a smoother surface than fiber glass; i.e., the surface has less protrusions of fiber which are prime sites for attack by chemicals, water, weathering, or abrasive conditions. These advantages make asbestos quite desirable even for the 1/16 inch resin of the enclosure.

It has been mentioned that the thickness of the fibrous insulation layer must be sufficient to absorb a large percentage of the underlying metal expansion, such that, with regard to the elasticity of the resin layer, rupturing of the latter is avoided. A further important point to note is that the fibrous insulation layer must have a thickness sufficient, with regard to the maximum temperature of the metal underlying the insulation layer, to hold resin temperature below that at which it loses strength; i.e., about 350° F. for the polyester resins (reinforced with asbestos fibers) and about 500° F. for the epoxy resins (note Table I). Generally, these two requirements are mutually complementary in that approximately the same insulation layer thickness satisfies both requirements. Experience has shown that for most high temperature applications, the thickness of the insulation layers will vary between two to four inches and ten inches, although greater or lesser dimensions may be used depending in particular on the overall dimensions of the metallic enclosure being insulated. For instance a four foot square duct having a relatively low temperature wall may require an insulation thickness of only about one inch.

As a general rule, the thickness of the insulation layer is designed so that the temperature of the reinforced resin layer will not exceed 150–250° F.

The following examples will help to illustrate the invention.

EXAMPLE I

Several 3 inch thick test sections of white "Limpet" (registered trademark of J. W. Roberts Ltd.), a blend of milled, air-separated, African amosite asbestos fibers cal-

TABLE II

| Material | Tensile Modulus of Elasticity ($\times 10^6$ p.s.i.) | Tensile Strength ($\times 10^3$ p.s.i.) | Elongation, Percent | Heat of Resistance, Maximum, °F. | Thermal Coef. of Expansion (in./in./°F. $\times 10^{-6}$) |
|---|---|---|---|---|---|
| Epoxy resin with fiber glass fabric | 3–3.5 | 24–60 | 1.6–2.0 | 500 | 4–6 |
| Polyester resin with fiber glass spray-up | .8–1.8 | 9–18 | 1.0–1.3 | 150–350 | 12–18 |
| Polyester resin with asbestos fibers | 1.3 | 15 | 1.0–1.5 | 350–450 | 10–17 |
| Polyester resin mineral filled—no reinforcement | .05–.25 | 3–5.5 |  | 300–350 | 19–37 |
| Carbon Steel | 30 | 29–33 | 38–30 |  | 6–8 |
| Aluminum | 10 | 6–27 | 30–40 |  | 12–13 |

An important aspect of the invention is that the surface fibers of the sprayed insulation layer serve to reinforce the resin layer. The characteristics of the mineral fibers (e.g., asbestos) which contribute most significantly to their utility as a reinforcing medium for resin compositions are: elevated temperature stability, fineness of subdivision and tensile strength. Table II showed the advantage with respect to strength as compared to fiber glass. Crocidolite asbestos fibers are also compared with fiber glass in the following table for tensile strength and fiber dimension:

TABLE III

|  | Tensile Strength (p.s.i. max.) | Fiber Dimension (in.) |
|---|---|---|
| Fiber Glass | 550,000 | .00026 |
| Crocidolite Asbestos | 876,000 | .00000076–.00000118 | cium-magnesium silicate) were applied to the bottom side of a furnace hopper section sloped at 60 degrees from horizontal. After more than a year in service, all sections held up well with no evidence of cracking or bulging. With no special surface preparation of the underlying metal adhesion appeared satisfactory.

In this test, no resin coating was applied, and the test was conducted to determine properties of the insulation. Similar tests showed that the insulation was resistant to vibration, was extremely adaptable to formabiltiy, could be applied to metal surfaces while hot, ranging from ambient up to 685° F., and was not subject to shrinkage or warpage.

EXAMPLE II

A ½ inch to 1 inch thick "Limpet" setting was sprayed onto two 4 foot by 6 foot sidewall furnace casings of a boiler. The "Limpet" surface was subsequently sprayed with a 1/8 inch thick layer of a polyester resin, the outer 1/16 inch being reinforced with fiber glass. A catalyst-injection spray system was used to apply the polyester, which cured within one hour to a tough, resilient, smooth surface integrally bonded to the "Limpet."

Continued service of the boiler with surface temperature of the resin at 135°–160° F. has resulted in no noticeable change in its physical condition.

During boiler service, failure of the brick and block setting on the inner side of the casing caused overheating of a portion of the enclosed boiler with discoloration, buckling and failure thereof. The adjacent resin discolored and became brittle but remained intact. No cracking or bulging of the remainder of the enclosure was noted.

EXAMPLE III

This example concerns the generalized tensile strain in the resin layer caused by thermal expansion of the unit enclosed metallic components. Again, two types of strain can be imposed on the reinforced resin layer enclosure, one being the overall expansion of the unit within the enclosure the force of which is transmitted through the insulation, the second being thermal movement of projections and direct strain on the resin layer.

A steam generator welded integral finned wall defining a rectangular furnace chamber has two inch diameter tubes on about 3¼ inch centers, with a maximum fin temperature of about 830° F., as compared to a tube wall temperature of about 730° F. (fluid temperature within the tubes is 680° F.). The wall, extending forty feet on each side, is coated with a blue "Limpet" sprayed asbestos insulation three inches thick from the outermost point of the tubes and four inches thick from the fins. On the surface of the insulation, a styrene modified polyester resin (American Cyanimid, trademark EPX–176–2) reinforced with fibers from the asbestos insulation and fiber glass roving forms a layer 1/8 inch in thickness, one half of the thickness of the layer being resin absorbed into the surface of the asbestos. The ratio of glass to resin in the remaining one half of the resin layer is about 30% glass, providing a strength for the resin layer which for the purposes of this example will be conservatively estimated at 13,000 p.s.i.

Ambient temperatures on the outside of the furnace vary between −40° and 120° F., with outside face temperature of the reinforced resin layer varying between −20° F. to 150° F.

Assuming a non-stressed condition at 80° F., a worse condition exists with average metal temperature at about 780° F. and ambient temperature at −40° F., producing a resin face temperature of −20° F.

Actually, the resin face temperature of −20° F. exists only for a short time during start up and until thermal equilibrium is reached at a higher hot face temperature, so that the effect of stress at this differential is minimized. In any event, the following expansions and contractions occur.

Steel tube wall expansion: $\Delta T \times$ coef. of expansion
$$= [780-80][6.1 \times 10^{-6}] = .00427 \text{ inch/inch}$$

Resin layer contraction: $\Delta T \times$ coef. of expansion
$$= [(+80°)-(-20°)][16 \times 10^{-6}]$$
$$= [100][16 \times 10^{-6}] = .0016 \text{ inch/inch}$$

Expansion difference $[\Delta 1]$: $[.00427 + .0016]$
$$= .00587 \text{ inch/inch}$$

Strain $[e]$: $\Delta 1/1 = .00587/1 = .00587$

Modulus of elasticity in tension for resin: $1.2 \times 10^6$

Working stress: $E_e = [.00587][1.2 \times 10^6]$
$$= 7050 \text{ lbs./inch}^2$$

Factor of safety: ultimate strength/working stress
$$= 13,000/7050 = 1.845$$

These calculations show that even with respect to thermal expansion of a metal surface between projections (such as soot blower openings), with a resulting direct stress placed on the reinforced resin layer, the layer has sufficient strength and elasticity to accommodate the expansion.

Concerning overall expansion within the reinforced resin layer, the compressibility of the insulation further improves the factor of safety. With very small loads, for instance 8 to 9 p.s.i., the insulation is compressed 25%. Fifteen percent deformation is accomplished with very low loads. It is apparent that in this example, substantially the entire expansion (about 80%) is compensated for by the insulation with a resulting small stress on the resin matrix.

However, it should be realized that economics dictate a minimum use of insulation as well as resin. In this example, high metal temperatures required an insulation thickness of 3 to 4 inches. With an insulation thickness of only one inch, in lower temperature work and a forty foot surface, the give at opposing ends combined will be 0.5 inch. The overall expansion difference of 2.4 inches [.0016 x 12 x 40] exceeds compression of the insulation by about 1.9 inches. Accordingly, the working stress can be computed as follows.

Working stress: $E_e = [1.9/480][1.2 \times 10^6] = [.00396][1.2 \times 10^6] = 4750 \text{ lbs./inch}^2$ Factor of safety: $13,000/4750 = 2.76$

EXAMPLE IV

With the use of flexible resin additives the elasticity is increased with no reduction in tensile strength. In this example, the resin is compounded as 15% EPX–126–3 (supra) 85% EPX–176–2 (Example III). With the same expansion difference as in Example III and a modulus of elasticity equal to $.5 \times 10^6$, the compounded resin provides the following factor of safety.

Working stress: $E_e = [.00587][.5 \times 10^6] = 2930 \text{ lbs./inch}^2$

Factor of safety: ultimate strength/working stress = $13,000/2930 = 4.41$

In this example, no fiber glass reinforcement, or fillers, are used.

These calculations show that a resin having a strength of about 5,000 p.s.i. with a flexible resin additive will provide a fair factor of safety.

One advantage evident in the above examples accrues from the resiliency of the insulation, or its ability to breath. As the outer reinforced resin layer and metal wall move differently integrity of the bonds between the metal, insulation and reinforced resin layer, is maintained as a result of this resiliency.

It should be noted that Examples III and IV do not take into consideration shrinkage of the polyester resin on curing, which shrinkage may be 4–8% volume-wise. Even with this shrinkage it is apparent that the factors of safety are high and within acceptable limits.

The following are some applications for the invention; waste heat boilers, steam generators, air heaters, flues, ducts, acoustical fireproof enclosures for ball mill housing, casing enclosures for marine boilers, process plant installation enclosures, steam header box and drum enclosures, piping insulation, fan housings, salt water conversion units, stacks, pipelines, waste gas scrubbers, and storage tanks.

Although the invention has been described in detail with respect to specific embodiments, many modifications within the scope of the claims will be apparent to those skilled in the art.

What is claimed is:

1. A chamber enclosing wall subjected to hot internal temperatures comprising
   a metallic enclosure;

a circumambient substantially continuous fibrous insulation layer covering the outer surface of the metallic enclosure and having an average thickness of at least one inch;

the insulation layer being of a heat resistant material and having a compressibility of at least 15% under a load of 5 pounds per square inch;

a continuous thermosetting resin layer covering the outer surface of the insulation layer;

the insulation and resin layer being applied so that the outer fibers of the insulation layer reinforce at least in part the resin layer, additional fibrous reinforcing means in the resin layer whereby said resin layer has a tensile strength of more than 5,000 p.s.i., and a modulus of elasticity less than about $3.5 \times 10^6$;

the elasticity of the resin layer and compressibility of the insulation layer being sufficient to compensate for thermal expansion and contraction of the metallic enclosure without the use of expansion joints.

2. A chamber enclosing wall according to claim 1 wherein said resin layer is composed of 10 parts of a polyester resin, of two parts fiber glass, and of two parts fibers from said insulation layer wherein approximately five parts of the resin is absorbed into the surface of the insulation to form an absorbed resin stratum, and wherein the resin and the fiber glass are applied to the surface in the ratio of at least two parts fiber glass to five parts resin to form an overlying resin stratum.

3. A chamber enclosing wall according to claim 2 wherein the fiber glass is continuous or chopped roving.

4. A chamber enclosing wall according to claim 1 wherein the fibrous insulation is asbestos coated with a binder of the class consisting of calcium aluminate and Portland cement, and the metallic surface is carbon steel.

5. A chamber enclosing wall according to claim 4 wherein the reinforced resin layer has a modulus of elasticity within the range of about $.5 \times 10^6$ to $3.5 \times 10^6$.

6. A chamber enclosing wall according to claim 4 wherein the insulation layer is at least about three inches thick and the modulus of elasticity of the resin layer is more than approximately $1.2 \times 10^6$ p.s.i.

7. A chamber enclosing wall subjected to hot internal temperatures comprising
a metallic enclosure;
a circumambient continuous fibrous insulation layer at least two inches in thickness covering the outer surface of the metallic enclosure;
a continuous circumambient thermosetting resin layer covering the outer surface of the insulation layer, the insulation and resin layers being applied wherein the fibers of the insulation layer reinforce at least in part the resin layer so that the latter is an integral part of the outer surface of the insulation layer;
additional fibrous reinforcing means in the resin layer, said resin layer having a modulus of elasticity within the range of $.5 \times 16^6$ p.s.i. and $3.5 \times 10^6$ and a tensile strength at least 5,000 p.s.i.;
the insulation layer having a compressibility of at least 25% at 5 p.s.i. and a thickness sufficient to maintain maximum stress on the resin layer less than the tensile strength of the resin layer.

8. A chamber enclosing wall according to claim 7 wherein said insulation layer is at least three inches thick.

9. A chamber enclosing wall according to claim 8 wherein the resin is a styrene modified polyester resin, and the insulation is asbestos with a binder of the class consisting of calcium aluminate and Portland cement.

10. A wall subjected to heat having a hot side and a cooler side comprising
a metallic surface having at least two spaced apart projections on the cooler side thereof;
a continuous fibrous insulation layer covering the cooler side of said metallic surface between said projections;
a continuous thermosetting resin layer covering the exposed side of the insulation layer;
the insulation and resin layers being applied so that the fibers of the insulation layer reinforce at least in part the resin layer whereby the latter is an integral part of the outer surface of the insulation layer;
the resin layer being bonded or mechanically attached to the metallic surface projections and having a tensile strength and modulus of elasticity sufficient to compensate for differential expansion between the metal surface and the resin layer;
the insulation being sufficiently expansible and compressible to breathe with the resin layer to prevent rupture of the resin to insulation bond.

11. A wall subjected to heat comprising
a metallic surface having a hot side and a cooler side;
a substantially continuous fibrous insulation layer covering the cooler side of said surface;
a continuous thermosetting resin layer covering the exposed side of the insulation layer;
the insulation and resin layers being applied so that the outer fibers of the insulation layer reinforce at least in part the resin layer whereby the latter is an integral part of the outer surface of the insulation layer;
additional reinforming means in the resin layer;
the metallic surface including projections to which the resin layer is directly bonded;
the resin layer having a strength and modulus of elasticity sufficient to compensate for direct stress imposed on the resin layer by said projections;
the insulation layer having a resiliency selected to compensate for expansion differences in the metallic surface.

References Cited

UNITED STATES PATENTS 3,111,440   11/1963   Prentice _____ 117—104 X
2,987,052    6/1961   Armacost _____ 122—6

FOREIGN PATENTS 425,163   1935   Great Britain.

OTHER REFERENCES

"Insulspray" by Weather Products Co. of Great Falls Montana, received Feb. 13, 1961, 4 pages 117–104.

JOHN MURTAGH, *Primary Examiner.*

FRANK L. ABBOTT, *Examiner.*